(12) United States Patent
Bhagavatula et al.

(10) Patent No.: US 6,810,195 B2
(45) Date of Patent: Oct. 26, 2004

(54) SECURING OPTICAL ELEMENTS AND OPTICAL DEVICES

(75) Inventors: Venkata A. Bhagavatula, Big Flats, NY (US); Sean M. Garner, Elmira, NY (US); James S. Sutherland, Corning, NY (US)

(73) Assignee: Cornining Incorporated, Corning, NY (US)

(*) Notice: Subject to any disclaimer, the term of this patent is extended or adjusted under 35 U.S.C. 154(b) by 54 days.

(21) Appl. No.: 10/328,131

(22) Filed: Dec. 19, 2002

(65) Prior Publication Data

US 2004/0120682 A1 Jun. 24, 2004

(51) Int. Cl.[7] .............................................. G02B 6/00
(52) U.S. Cl. ........................... 385/137; 385/65; 385/83
(58) Field of Search ........................... 385/65, 85, 137, 385/83, 62, 87

(56) References Cited

U.S. PATENT DOCUMENTS

| | | | |
|---|---|---|---|
| 4,111,522 A | 9/1978 | Auracher et al. | 350/96 C |
| 4,730,892 A | 3/1988 | Anderson et al. | 350/96.21 |
| 4,735,677 A | 4/1988 | Kawachi et al. | 156/633 |
| 4,750,799 A | 6/1988 | Kawachi et al. | 350/96.11 |
| 4,765,702 A | 8/1988 | Dohan et al. | 350/96.12 |
| 4,767,174 A | 8/1988 | Carenco et al. | 350/96.2 |
| 4,796,975 A | 1/1989 | Lukas et al. | 350/320 |
| 4,828,362 A | 5/1989 | Skinner et al. | 350/320 |
| 4,856,865 A | 8/1989 | Lee | 350/96.21 |
| 4,883,743 A | 11/1989 | Booth et al. | 430/321 |
| 4,969,705 A | 11/1990 | Stoy et al. | 350/96.21 |
| 4,973,126 A | 11/1990 | Degani et al. | 350/96.21 |
| 5,029,972 A | 7/1991 | Lukas et al. | 350/96.21 |
| 5,046,808 A | 9/1991 | Chang | 385/13 |
| 5,080,458 A | 1/1992 | Hockaday | 385/14 |
| 5,150,440 A | 9/1992 | Booth | 385/49 |
| 5,159,653 A | 10/1992 | Carpenter et al. | 385/95 |
| 5,239,601 A | 8/1993 | Denis et al. | 385/49 |
| 5,311,604 A | 5/1994 | Rogner et al. | 385/14 |
| 5,359,687 A * | 10/1994 | McFarland et al. | 385/49 |
| 5,420,688 A | 5/1995 | Farah | 438/31 |
| 5,891,747 A | 4/1999 | Farah | 438/31 |
| 5,961,849 A * | 10/1999 | Bostock et al. | 216/24 |
| 6,266,472 B1 * | 7/2001 | Norwood et al. | 385/137 |
| 6,335,149 B1 | 1/2002 | Xu et al. | 430/321 |
| 6,360,043 B1 | 3/2002 | Bostock et al. | 385/49 |
| 2003/0175000 A1 * | 9/2003 | Caracci et al. | 385/137 |

FOREIGN PATENT DOCUMENTS

| | | | |
|---|---|---|---|
| EP | 0 065 096 | 12/1985 | G02B/6/24 |
| EP | 0 290 253 | 1/1994 | G02B/6/255 |
| EP | 0 429 877 | 6/1995 | G02B/6/36 |
| JP | 58-072385 | 11/1984 | H01S/3/18 |
| JP | 59-101605 | 12/1984 | G02B/5/174 |
| JP | 02-157805 | 12/1988 | G02B/6/30 |
| WO | WO 87/05119 | 8/1987 | G02B/6/38 |
| WO | WO 91/13378 | 9/1991 | G02B/6/30 |
| WO | WO 95/06270 | 3/1995 | G02B/6/30 |

* cited by examiner

Primary Examiner—Hae Moon Hyeon
(74) Attorney, Agent, or Firm—Timothy M. Schaeberle

(57) ABSTRACT

Articles and methods for securing or aligning objects on substrates are disclosed. The articles and methods include a gripping element disposed on a substrate that includes a groove and flexible gripping elements. The articles and methods are particularly useful for securing optical fibers in arrays and manufacturing optical devices.

7 Claims, 3 Drawing Sheets

SECURING OPTICAL ELEMENTS AND OPTICAL DEVICES

FIELD OF THE INVENTION

This invention relates to securing optical elements to substrates.

BACKGROUND OF THE INVENTION

Several technologies exist for aligning arrays of optical elements such as optical fibers and ball lenses to provide various photonic devices and fiber blocks. Two examples of such technologies include V-grooves formed in silicon substrates and flexible gripping elements fabricated onto the surface of a variety of substrates.

Silicon V-grooves can be formed by micromachining, etching or other techniques to accurately align the grooves along the crystal planes of a silicon substrate. Typically, V-groove fiber arrays are made by placing optical fibers in V-grooves of a substrate, placing a lid on the fibers, and then securing the assembly with adhesive. The lid can be a substrate containing V-grooves or a flat silicon or glass plate. The adhesive is typically a UV-curable or heat-curable epoxy. Such devices are capable of withstanding compressive and shear forces without deformation. In addition, V-grooves can be reused numerous times, and the fibers can be positioned by sliding fibers within the groove along the axis of the grooves until accurate alignment is achieved. V-grooves can be used to produce 125 micron fiber arrays with spacings as low as 127 microns between fiber centers. Limitations of V-groove technology include limited substrate materials, assembly time, fabrication tolerance, and the requirement of adhesives to complete assembly.

One example of a problem associated with the use of adhesives is that it can be difficult to position optical fibers in conventional V-grooves because adhesive flows into the small spaces between the fibers and V-grooves. Since the adhesive flows into these spaces, the entire length of the fiber is secured to the V-groove chip in a single step. It is not possible to secure the fiber in the V-groove in multiple gluing steps. This is a problem for certain fiber arrays because multiple gluing steps can improve the alignment of optical fibers.

Flexible gripping elements are disclosed in U.S. Pat. Nos. 6,266,472 and 5,359,687. Gripping elements or grippers are versatile structures fabricated from flexible polymeric materials. An example of one way to manufacture grippers includes photolithographic processes, which can be used to form grippers on a variety of substrates. Grippers require less precise dimensional tolerances than V-grooves to hold fibers, and fibers easily snap into, and are held in, place without the use of adhesives. Grippers, however, are limited in that they deform under external forces, they exert frictional forces on the fiber during alignment, which makes alignment more difficult. Furthermore, spacing between fibers is typically limited to about 250 microns.

It would be desirable to provide alignment methods and articles for optical fibers that combined certain advantages of both V-groove and gripper technologies while, at the same time, avoiding certain disadvantages of each of the technologies. Such alignment methods and articles would facilitate the manufacture of a wide variety of optical devices.

SUMMARY OF THE INVENTION

Certain embodiments of the invention relate to methods and articles for positioning arrays of objects, for example cylindrical objects such as optical fibers, and spherical objects such as ball lenses, and optical devices including such arrays. Certain embodiments of the present invention provide relatively simple and inexpensive methods and articles for positioning optical fibers and devices comprising optical fiber arrays. According to certain embodiments, the methods and articles do not require adhesives for securing the fibers in the V-grooves. It is to be understood that both the foregoing general description and the following detailed description are exemplary and are intended to provide further explanation of the invention as claimed.

DETAILED DESCRIPTION

Before describing several exemplary embodiments of the invention, it is to be understood that the invention is not limited to the details of construction or process steps set forth in the following description. The invention is capable of other embodiments and of being practiced or carried out in various ways.

Figure 1:
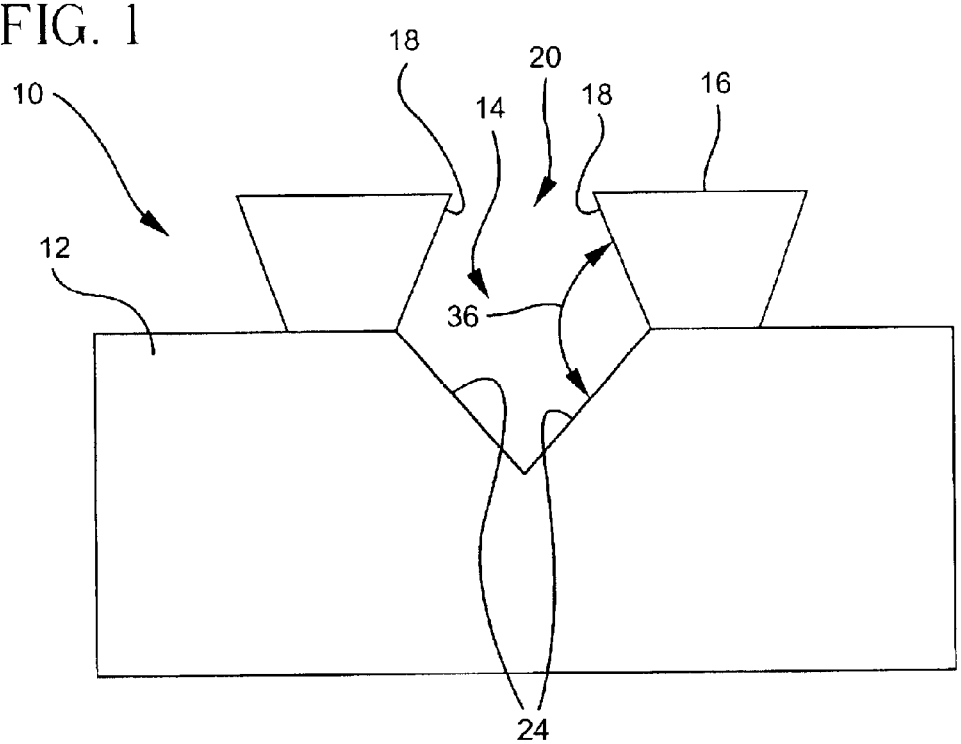
FIG. 1 is a side view of a substrate including a groove and a gripping element according to one embodiment of the invention.
Figure 2:
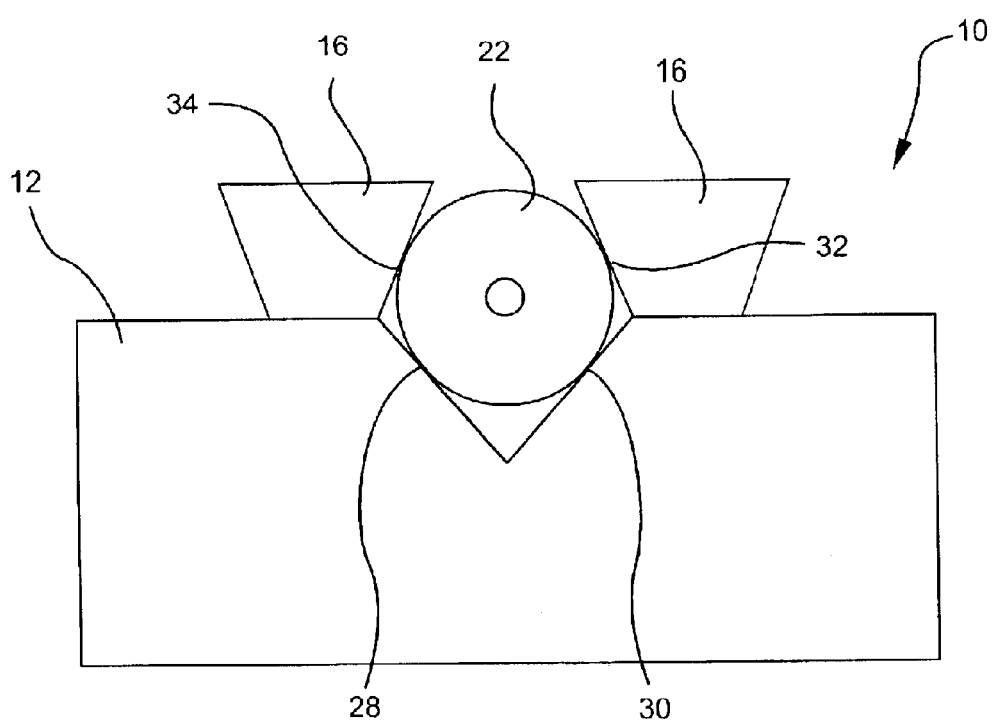
FIG. 2 is a side view of a substrate including a groove and a gripping element holding a cylindrical object according to one embodiment of the invention.
Figure 3:
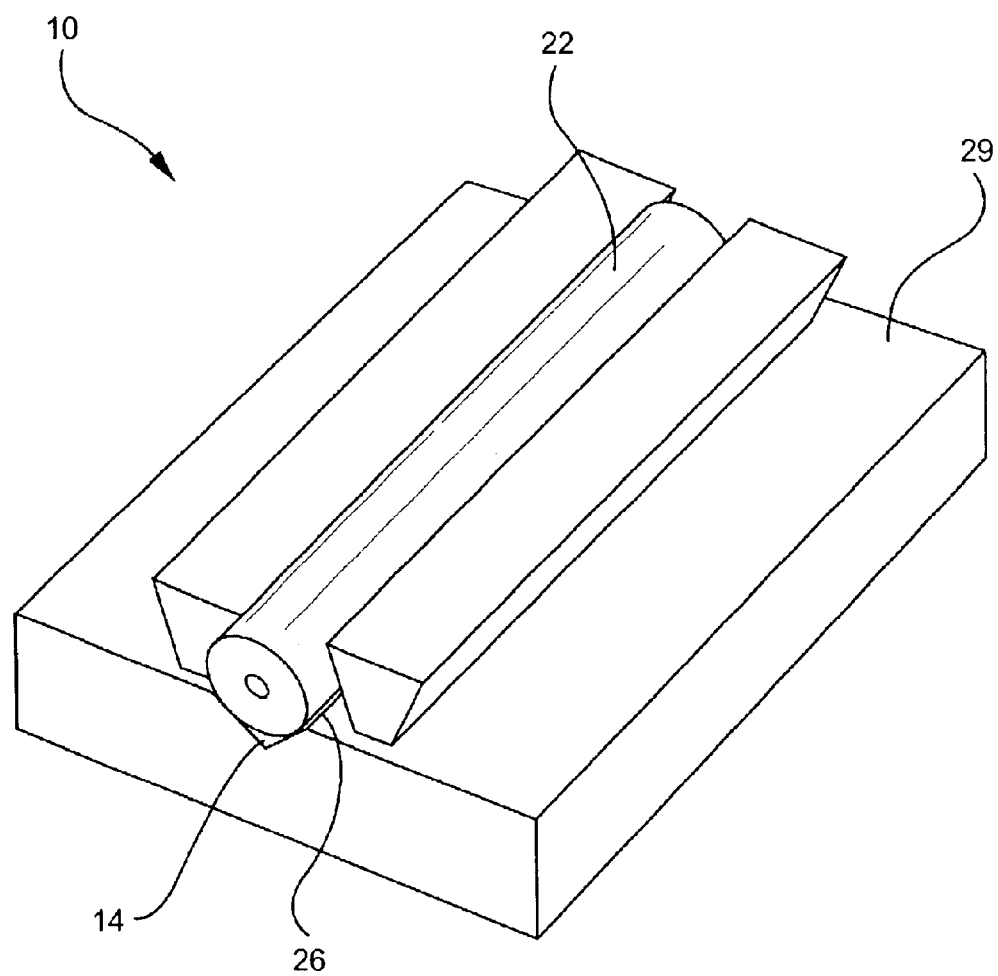
FIG. 3 is a perspective view of a substrate including a groove and a fiber gripping element holding a cylindrical object according to one embodiment of the invention.

In overview, certain embodiments of the present invention relate to articles for securing optical elements, for example, optical elements including optical fibers, to substrates. Other embodiments relate to methods of securing such optical elements to substrates, methods of making such articles, and optical devices including such articles. An exemplary article for securing optical elements to substrates is shown in FIG. 1. The article 10, includes a substrate 12 having a groove 14 in a surface thereof, the groove 14 adapted to receive an optical element. A gripping element 16 including at least a pair of flexible sidewalls 18 define a channel 20, is positioned on the substrate 12 to cooperate with groove 14 to function to hold the optical element 22 in place in the substrate groove 14 as shown in FIGS. 2 and 3. In certain specific embodiments, the substrate 12 is a planar substrate, the optical element 22 includes an optical fiber and the groove 14 is defined in a top surface of the substrate 12 and the gripping element 16 is positioned to secure the fiber in the groove 14. According to certain embodiments, the groove and the channel cooperate to secure to optical element to the substrate. According to other embodiments, the groove and the gripping element cooperate to passively align the optical element to a second optical element. In certain embodiments, the groove and the gripping elements may be sized and spaced to accommodate an optical element having a diameter that longitudinally varies. For example, it may be desirable in the manufacture of an optical device to secure a tapered optical fiber having a diameter that varies as a function of length. In such a device, it may be desirable to vary the dimensions of the groove and the grippers to secure the fiber to the substrate.

In certain embodiments, the groove 14 can include at least one lower surface 24 below the top surface of the substrate 12 and a pair of edges 26 in a top surface of the substrate, and the pair of flexible 18 sidewalls are positioned adjacent the pair of edges 26. In certain embodiments, the optical element is held to the substrate by 4 points of contact 28, 30, 32 and 34 along the longitudinal axis of the optical element 22; see FIG. 2. Specifically, the groove 14 provides 2 points of contact 28 and 30 with the optical element 22 or fiber while the gripping element 16 provides 2 points of contact 32, 34 with the optical element 22 or fiber. Four points of contact provides a distribution of frictional forces across more elements and better guidance of the fiber while sliding it into place than in conventional alignment devices. It will be understood that the invention is not limited any number of points of contact. For example, the groove could be curved (e.g. u-shaped) and provide only one point of contact. Alternatively, more than 2 points of contact can be provided by the at least one lower surface. The deformable nature of the grippers forces the cylindrical object 22 or fiber down into the groove 14 even when the diameter of the optical element 22 or fiber varies over a limited range. Therefore the optical element 22 or fiber is held in contact with the groove 14 and immobilized during subsequent operations.

The groove 14 can be V-shaped in cross-section as shown in the Figures, or alternatively, it may have a square, rectangular U-shaped or trapezoidal cross-section (not shown). The grooves can be formed by a variety of forming techniques known in the art including wet etching, dry etching, dice sawing, molding or micromachining in substrate materials including but not limited to, silicon, polymers, metals, and glass. The substrate provides rigidity for the article, and alignment control of the fibers is not dependent on groove shape. In embodiments in which the optical element includes an optical fiber, the grooves provide partial durable horizontal and partial vertical control of fiber alignment, which is useful in applications such as collimated fiber components with long working distances. The distribution of horizontal forces between the v-groove and grippers depends on the vertical position of the fiber center. Passively aligned micro-optic components used for collimated distances of greater than one centimeter require angular alignment tolerances of less than about 1 degree. According to some embodiments, the rigidity of the substrate, such as a single crystal silicon allows this control. Gripping elements center the fiber in the grooves by equalizing horizontal forces.

Figure 4:
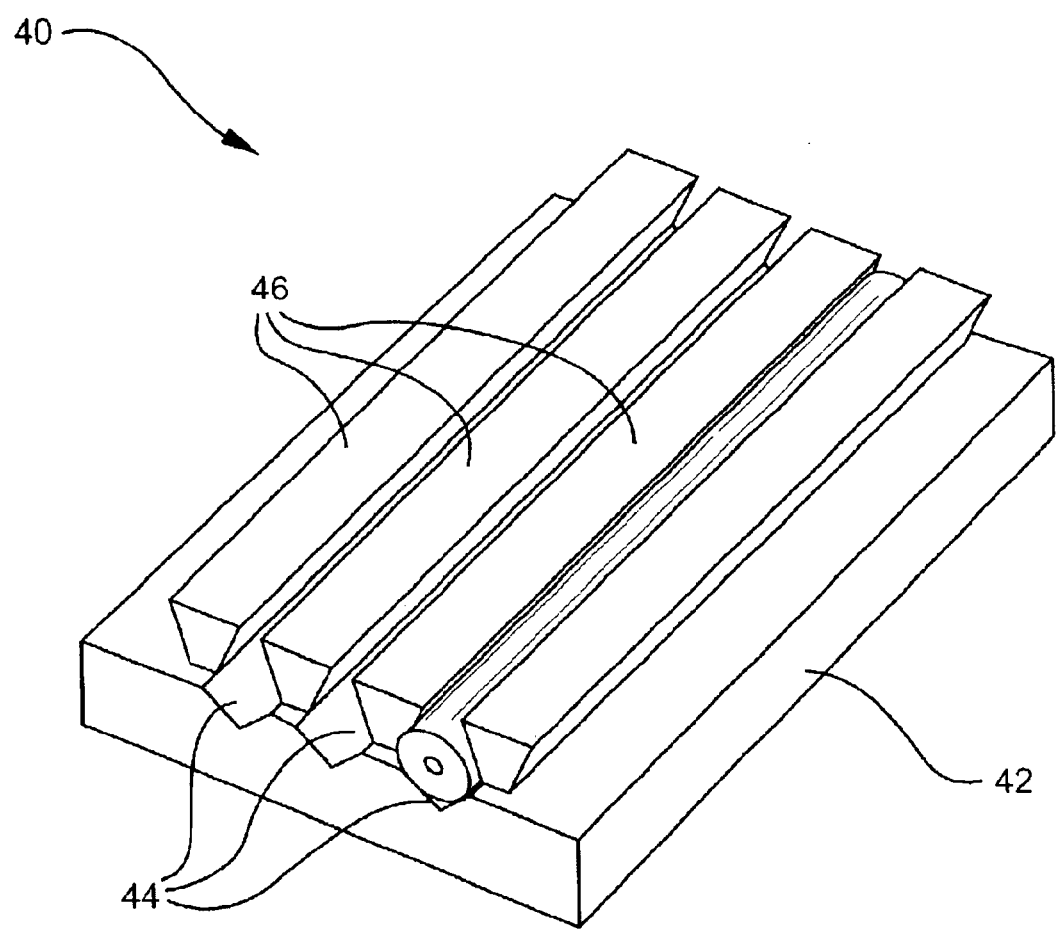
FIG. 4 is a perspective view of a substrate including a plurality of grooves and gripping elements arranged on the substrate for holding an array of cylindrical objects.

In certain embodiments, the gripping element 16 includes at least a pair of trapezoidally shaped members positioned adjacent the groove as shown in FIGS. 1 and 2, and the sidewalls 18 form an oblique angle 36 with the surface of the groove 14 in contact with the fiber. The members forming the gripping element 16 can have other shapes in additional to trapezoidal shapes. In certain embodiments, a space is provided between the groove edge 26 and the gripping elements along the top surface of the substrate as shown in FIG. 3. According to certain embodiments, the gripping elements may extend into a portion of the groove, or the gripping elements could be formed in a portion of the groove (not shown). As shown in FIG. 4, in some embodiments, articles 40 are provided includes a substrate 42 having a plurality of grooves 44 defined therein and a plurality of gripping elements 46 arranged to hold an array of cylindrical objects such as optical fibers, preferably in a parallel arrangement.

Details on the construction of gripping elements are described in U.S. Pat. Nos. 6,266,472 and 5,359,687, both of which are incorporated herein by reference. In U.S. Pat. No. 5,359,687, the gripping elements, which are also called polymer microstructures, are formed on a substrate and used to grip optical fibers and position these fibers with respect to a waveguide disposed on the substrate. U.S. Pat. No. 6,266, 472 describes polymer gripping elements that are used in splicing optical fibers.

Gripping elements can be manufactured by depositing strips of material on the surface of the substrate. The strips that make up the gripping elements can be formed using well-known lithographic processes using photopolymerizable compositions and the like. For example, a photopolymerizable composition can be substantially uniformly deposited on onto a substrate surface. The photopolymerizable composition is then imagewise exposed to actinic radiation using a laser and a computer-controlled stage to expose precise areas of the composition with an ultraviolet laser beam, or a collimated UV lamp together with a photomask having a pattern of substantially transparent and substantially opaque areas. The nonimaged areas can then be removed with solvent, while leaving the imaged areas in the form of at least one gripping element on the substrate surface.

Alternatively, flexible strips can be formed by using a soft, flexible embossing tool to pattern the polymerizable composition in the form of at least one gripping element on the substrate surface. Such soft tooling is commonly made with silicones. The composition is then cured and the tool is removed. The flexibility of the tool must be sufficient so that it can be removed from the cured polymer without damaging the grippers. The polymerizable composition may be cured by various means such as actinic radiation or heat, and should have the viscosity to conform to the raised features of the tool. After removing the tool from the cured composition, at least one gripping element will remain on the substrate, depending on the nature of the pattern. The pattern of the tool may include a plurality of gripping elements to provide a substrate for aligning fiber and lens arrays. Suitable polymeric compositions for making the gripping elements are disclosed in commonly assigned U.S. Pat. No. 6,266,472. In the embodiments shown in the Figures, the gripping elements are shown as unitary strips of material. It will be appreciated, that the gripping elements can be formed by a plurality of segmented strips of material linearly arranged. Segmented gripping elements allows for sliding motion of cylindrical objects positioned in the gripping elements along the length of the groove.

According to certain embodiments, in addition to an optical fiber, the cylindrical object further includes a lens or other optical devices such as expanded core collimators, ball lenses and non-pigtailed gradient refractive index collimators. Thus, the articles according to certain embodiments of the invention can be used to manufacture a wide variety of optical components including fiber blocks, lens arrays, collimators for two port of multiport micro-optic devices, splitters, combiners, wavelength filters, optical isolators, circulators, photodetectors, laser sources and gain fibers.

Other embodiments of the invention relate to methods of securing an optical element to the surface of a substrate. In some embodiments, the optical elements are cylindrical or spherical objects. According to certain embodiments, the method includes forming a groove in a surface of the substrate and securing a gripping element on the surface of the substrate, the gripping element including at least a pair of flexible sidewalls defining a channel. The gripping element positioned to cooperate with the groove to hold the object to the substrate. The method further includes inserting the optical element in the channel and the groove. In some embodiments, the optical element is a cylindrical object and includes an optical fiber. According to some embodiments, the method includes forming a plurality of generally parallel grooves and generally parallel gripping elements on the surface of the substrate. After forming the plurality of grooves and gripping elements, a plurality of fibers are inserted in the channels and the grooves to secure the fibers to the substrate. In some embodiments, the gripping elements are formed by depositing a polymeric material through a mask.

According to certain embodiments, the methods and articles of the present invention can be used to manufacture optical devices comprising more than one optical fiber to form an optical fiber array. An exemplary optical device can be formed by inserting individual fibers from a fiber array in a plurality of generally parallel grooves formed in a substrate and securing individual fibers in the grooves with a plurality of flexible gripping elements, each of the gripping elements including a pair of flexible sidewalls positioned adjacent the grooves. In some embodiments, the optical fibers are positioned with respect to an optical element. Such optical elements can include a prism including multiple thin film filters, lenses, gratings, or mirrors a switching element such as a MEMS switch, an electroholographic switch or a LCD switch. Other optical elements include isolator or circulator elements, photodetectors, laser or LED sources, semiconductor optical amplifier chips, electro-optic or acousto-optic modulation devices, or similar functions implemented using planar optical components (such as arrayed waveguide grating devices, variable optical attenuator arrays, switches, splitters and taps. The hybrid gripping element and groove holding articles of the present invention can be used to provide low cost assembly of microelectromechanical (MEMs) devices, and gripping elements can be added to single crystal substrates that allow passive pigtailing of these types of devices.

Examples of optical devices that can be made using the hybrid alignment articles and methods of the present invention include splitters, combiners, wavelength filters, optical isolators, circulators, photodetectors, laser sources and gain fibers. Other examples include optical fiber and lens arrays, which are used to couple light between optical fibers and optical devices in optical communication systems. Conventional optical fiber and lens arrays typically include a plurality of fibers to provide a fiber array arranged in a silicon v-grooves, and the fiber ends are abutted to a lens array, which can be molded from an appropriate polymeric or glass material. The hybrid alignment article of the present invention will allow greater flexibility in positioning the fibers and ease of construction of the fiber arrays. As used herein, the term fiber arrays means two or more fibers arranged on a substrate. The fibers are positioned over their respective gripping elements formed on a substrate and inserted into the gripping elements and grooves to secure the fibers on the substrate. The articles and methods of the present invention are useful for positioning opposing arrays of lensed fibers having optical components such as filters and polarizers disposed between the opposing arrays. The opposing arrays as well as the optical components can be positioned on a common substrate or on different substrates.

The hybrid gripping element and groove holding articles of the present invention provide greater holding for and distribution of frictional forces when compared to holding devices comprised of V-grooves or gripping elements alone. The substrate absorbs some of the fiber impact and frictional forces, resulting in less wear or damage to the flexible gripping elements. Gripping elements having a smaller footprint can be provided since the gripping elements are not required to absorb high horizontal and vertical force. A smaller gripping element footprint allows the gripping elements to be spaced closer together than conventional gripping elements when used alone. Individual gripping elements can also be used to hold more than one fiber because the horizontal force of the fiber is absorbed partially by the groove in the substrate. Accordingly, a single gripping element positioned on a substrate can be used to hold two fibers in grooves in the substrate. The gripping element can also be manufactured with lower dimensional tolerances and lower heights than in conventional gripping elements. The hybrid design also allows for the grooves to be fabricated with lower dimensional tolerances than in conventional v-groove devices. V-groove depths can be varied between 10 and 110 microns, and differences in groove height can be corrected during polymer gripping element fabrication. In addition to performing a vertical holding force on the fiber in the groove, gripping elements can also serve other functions for connector applications such as securing a protective lid element or providing strain relief or providing a reservoir for adhesives.

It will be apparent to those skilled in the art that various modifications and variations can be made to the present invention without departing from the spirit or scope of the invention. For example, while the Figures show the present invention being used to secure and align cylindrical objects, it will be appreciated that objects of other shapes can be secured and aligned as well. For example, the invention is also applicable to spherical objects and objects with non-circular cross sections, such as square or rectangular cross sections. Thus, it is intended that the present invention cover modifications and variations of this invention provided they come within the scope of the appended claims and their equivalents.

What is claimed is:

1. An article for holding an optical element, comprising:
a substrate;
a groove formed in the substrate for holding a first portion of the optical element, the groove being defined by a pair of first surfaces having first edges on a surface of the substrate; and
a gripping element formed on the surface of the substrate, the gripping element including at least a pair of flexible sidewalls having a pair of second surfaces for gripping a second portion of the optical element, the second surfaces defining a channel for holding the second portion of the optical element, the channel being situated above the groove, the second surfaces having second edges on the surface of the substrate which are laterally spaced from the first edges.

2. The article of claim 1, wherein the substrate is a planar substrate.

3. The article of claim 1, wherein the sidewalls have a trapezoidal shape.

4. The article of claim 1, wherein the groove has a V-shape.

5. The article of claim 4, wherein a depth of the groove ranges from 10 to 110 microns.

6. The article of claim 1, wherein the substrate is made from a material selected from the group consisting of a single crystal material, silicon, a metal, a polymer, glass, and ceramics.

7. The article of claim 1, wherein a plurality of the grooves are formed in the substrate and a plurality of the gripping elements are formed on the substrate, the grooves and gripping elements cooperating to hold a plurality of optical elements.

* * * * *

UNITED STATES PATENT AND TRADEMARK OFFICE
CERTIFICATE OF CORRECTION

PATENT NO. : 6,810,195 B2
DATED : October 26, 2004
INVENTOR(S) : Bhagavatula et al.

It is certified that error appears in the above-identified patent and that said Letters Patent is hereby corrected as shown below:

<u>Title page,</u>
Item [73], Assignee, should read:
-- Corning Incorporated, Corning NY (US) --

Signed and Sealed this

Fifteenth Day of February, 2005

JON W. DUDAS
*Director of the United States Patent and Trademark Office*